Sept. 30, 1941.   W. PAULUS   2,257,346
POWER TRANSMITTING UNIT
Original Filed Nov. 9, 1938

INVENTOR
William Paulus,
BY
Beau, Brooks, Buckley & Beau
ATTORNEYS

Patented Sept. 30, 1941

2,257,346

UNITED STATES PATENT OFFICE 2,257,346

POWER TRANSMITTING UNIT

William Paulus, Buffalo, N. Y., assignor to Trico Products Corporation, Buffalo, N. Y.

Original application November 9, 1938, Serial No. 239,643, now Patent No. 2,252,351, dated August 12, 1941. Divided and this application September 23, 1939, Serial No. 296,283

6 Claims. (Cl. 287—90)

This invention relates to a power transmitting unit and a ball and socket joint forming a part thereof.

The advantage of the ball and socket connection between the driving and driven parts of a mechanism are well known in the art of mechanics. However, the constructions of this type of joint heretofore designed have been difficult to incorporate in power transmitting units, such as those utilized in the windshield cleaner systems of present day motor vehicles.

The present invention has for its object to provide a novel joint and unit which is practical for mass production methods and efficient in use, and further one which will facilitate its installation in the fabrication of a motor vehicle as a part of an accessory system thereof, such as the automatic windshield cleaner.

This application is a division of Patent No. 2,252,351 granted August 12, 1941, which is a continuation-in-part of Patent No. 2,252,350, granted August 12, 1941.

Figure 1:
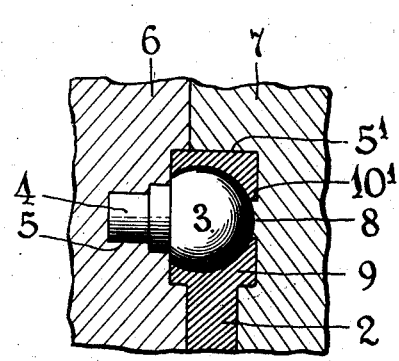
Figure 3:
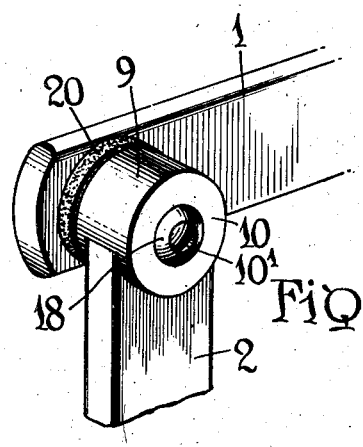
Figure 2:
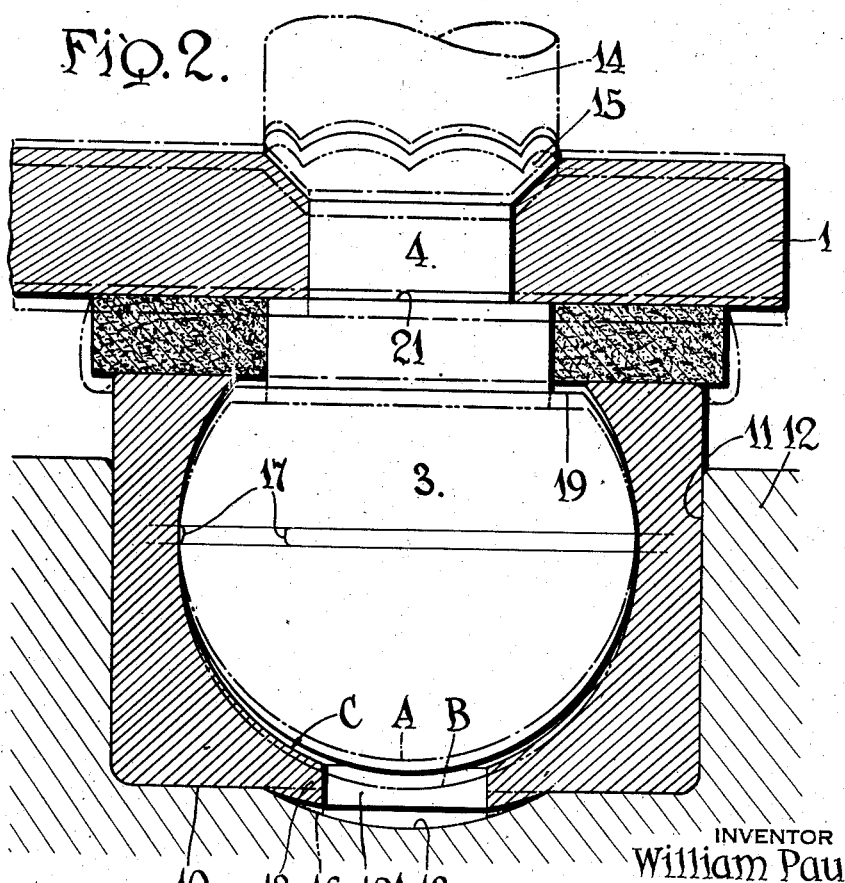

As showing one embodiment of the present invention, reference is made to the accompanying drawing wherein Fig. 1 is a fragmentary sectional view of the unit in the process of manufacture;

Fig. 2 is a similar view of the unit but on an exaggerated scale and depicting the final step of manufacture; and Fig. 3 is a fragmentary perspective view of the completed unit.

Referring more particularly to the drawing, the ball and socket joint of the present invention, which obviously may be produced per se without reference to any particular field of use, has been illustrated herein as connecting the push-pull link 1 and the arm 2 of a power transmitting unit of any appropriate design according to the mechanism in which it is designed to be used. The ball part 3 of the joint is preferably formed of a relatively hard metal such as steel and is anchored by its shank 4 within the cavity or recess 5 of one of the separable parts 6 and 7 of a mold, the supplemental recess 5' having a positioning stud 8 axially related to and cooperating with the shank 4 to support the ball in position during the initial step of manufacturing the joint. Prior to this step, which is practically accomplished by a die casting operation, the ball may be coated with graphite, if desired, to lessen the tendency of adhesion between the parts. The socket part 9 of the joint is cast, along with the arm 2 about the anchored ball by expressing the molten metal into the composite mold cavity in accordance with any approved die casting operation. This socket is preferably of a relatively softer metal, such as zinc alloy, and because of the presence of the stud 8, its bottom wall 10 will be formed with an opening 10' which reduces the metal in the portion of the socket opposite the shank 4 for weakening the same. The socket wall at such point may be cast thin without an opening, if desired, just so there is provided a comparatively weak area or zone in the bottom wall of the socket axially of the shank. The side walls of the socket member are formed heavier for better accommodating the lateral thrusts from the ball when embodied in a power transmitting unit.

Following the casting of the socket part about the relatively harder ball part the joint is removed from the mold and placed in the recess 11 of an anvil 12. The bottom wall of the recess is centrally dished, as at 13, immediately underlying the opening 10' and the adjacent portion of the bottom wall 10. The reason for this depression 13 is to permit such bottom wall portion yielding thereinto during the adhesion-breaking step in the process now to be described.

With the socket part of the joint positioned on the anvil and the link 1 located over the shank 4, the latter is struck a blow, as through a swaging tool 14. The force of the impact is so designed as to jar the ball loose from the socket walls, for freely swiveling therein, and to concurrently spread the outer end of the shank over the link 1, as indicated at 15, to unite rigidly the parts of the power transmitting unit. While these two operations may be performed separately, the final product is expeditiously completed by the single step just related.

This adhesion-breaking step has been clearly depicted by the exaggerated showing of Fig. 2, wherein the dot and dash line A indicates the initial position of the lower part of the socket wall with respect to the upper part thereof (disregarding possible slight variation due to shrinkage pressure of the cast socket member on the ball), wherein the double dot and dash line B indicates the extreme limit of travel of the ball under the impact as determined by the weakened bottom portion of the socket member bottoming in the depression 13, as illustrated at 16, and wherein the solid line C indicates the finished elongated shape of the socket which it assumes upon the rebound of the distended portion from the depression 13. The result of this elongation of the socket produces an equatorial or medial portion 17 which is cylindrical, and the weakened bottom portion is displaced about the opening 10', as shown at 18. By reason of this socket elongation the metal in the socket is obviously crowded under the pressure of the ball against the anvil except where the depression 13 receives the displaced metal. The cylindrical portion 17 has a diameter equal to or slightly greater than the outside diameter of the ball so that the latter may move lengthwise of the axis of the shank and rotatively thereabout as well as angularly within the socket.

It will be observed that a definite clearance is provided between the hemispherical portions of the ball and the socket walls at opposite sides of the cylindrical portion 17 whereby the ball may have free universal as well as bodily movements within the socket but that lateral thrust will be accommodated without play or lost motion. This is desirable in that the force is directly transmitted from the link 1 to the laterally extending arm 2 without noise or backlash in its action. Furthermore, any binding between the ball and socket parts will therefore be confined primarily to the cylindrical portion. Therefore, should the ball have a slightly irregular contour resulting from the mass production methods now in vogue, such irregularity will only manifest itself at the medial zone and not elsewhere because of the relatively greater clearance in the hemispherical portions. The surface of the cylindrical wall will be smoothed and finished for a better bearing contact of the ball thereon, this condition of the surface being obtained from the sliding of the ball thereover at the time of breaking the adhesion under the impact of the blow on the shank 4. The ball-smoothed or ball-ironed wall surface, while given this finished condition, will conform closely to the ball contour at its central plane with a minimum clearance. The bottom hemispherical portion will also be given a smoothing action and will likewise conform to the surface contour of the adjacent hemispherical portion of the ball but greater clearance is here provided by reason of the displacement.

In connection with the die casting operation, as the socket cools off it will shrink about the ball and consequently when the ball is given a sharp blow, the upper portion of the socket adjacent the protruding shank will microscopically follow the ball due to its initial shrinkage stresses onto the ball. The continued movement of the ball will obviously withdraw the ball from the upper portion of the socket and thereby break any adhesion between the parts in this locality. Upon release of the pressure from the impact, the ball springs back a trifle but the impact is so controlled that the return push of the ball does not carry the latter into pressure contact with such upper portion of the socket. Consequently in its final condition the ball will have a very slight free end movement which has been exaggerated in Fig. 2 for ease of description. This back and forth movement of the ball loosens it in its side contact with the die cast metal for free universal action.

The ball is flattened about the shank to provide a shoulder 19 for supporting a lubricant holding felt ring 20 as a means for lubricating the formed joint. The shank 4 is reduced outwardly beyond this shoulder to form a second shoulder 21 for supporting the power link 1 during the swaging step and serves, together with the spread portion 15, in confining the pivotal movement of the link on the shank.

From the foregoing it will be apparent that a novel power transmitting unit and universal joint have been developed which are economically manufactured and efficient in use. While the description has been given in detail it is not the intention thereby to restrict the scope of the invention except as defined by the appended claims.

What is claimed is:

1. A ball and socket joint comprising a ball part having a flat face with a mounting shank rising therefrom, a socket part enclosing the ball part from the flat face thereof and having a medial portion of cylindrical form substantially coaxial with the shank and confining the ball part to bodily movement in an axial direction whereby the spherical surface of the ball part about the flat face may be spaced from the socket wall, a reciprocating member extending laterally from the shank, a second member extending laterally from the socket, the shank having a shoulder spaced above the flat face serving to space the reciprocating member therefrom, and a lubricant holding ring encircling the shank and extending outwardly over the flat face and seating on the surrounding portion of the socket part.

2. A ball and socket joint comprising a ball part having a flat face with a mounting shank rising therefrom, a socket part enclosing the ball part from the flat face thereof and having a medial portion of cylindrical form substantially coaxial with the shank and confining the ball part to bodily movement in an axial direction whereby the spherical surface of the ball part about the flat face may be spaced from the socket wall, a reciprocating member extending laterally from the shank, a second member extending laterally from the socket, the shank having a shoulder spaced above the flat face serving to space the reciprocating member therefrom, and a lubricant holding ring encircling the shank and extending outwardly over the flat face and seating on the surrounding portion of the socket part, the bottom wall of the socket part opposite the flat face being formed with an opening of less diameter than such flat face.

3. A power transmitting joint comprising a ball part having a mounting shank, and a socket part of relatively softer metal enclosing the ball part free of the shank, the socket of the socket part having a cylindrical wall portion separating two end and partially spherical wall portions, the surface of the cylindrical wall portion being ball-ironed and conforming to the surface contour of the ball part at its central plane for bearing contact thereon with a minimum clearance, the two end wall portions having relatively greater clearance to avoid binding upon the ball part.

4. A ball and socket joint comprising a ball part having a radially extending mounting shank, and a socket part substantially enclosing the ball part and having a cylindrical portion coaxial with the shank to permit bodily movement of the ball part, the cylindrical portion having a ball-ironed contacting surface in close conforming engagement with the ball, the socket portions at the opposite sides of the cylindrical portion being loose and free of the ball.

5. A power transmitting ball and socket joint comprising a ball part having a radially extending mounting shank, and a socket part of relatively softer metal cast about the ball part to snugly fit the ball in conformity with the medial portion thereof and itself having a cylindrical wall portion with a ball-ironed surface in close conforming engagement with the medial portion of the ball, the spherical portions of the ball on opposite sides of the medial portion being free from the socket wall, and means for applying power for transmission between the ball-ironed surface and the snug fitting ball.

6. A unit having a ball part provided with a shank, and a relatively softer socket part formed about and substantially enclosing the ball part, the socket part having a hemispherical socket wall surface shaped and smoothed by the ball to conform closely to the ball surface, said socket part also having a substantially cylindrical wall surface adjoining the first surface and smoothed by the ball in close conformity to the surface of the ball at the central plane thereof, the ball having play clearance with the first surface.

WILLIAM PAULUS.